United States Patent Office 3,297,545
Patented Jan. 10, 1967

3,297,545
PREPARATION AND RECOVERY OF HYDROGEN
James E. Zajic and Dean A. McGee, Oklahoma City, Okla., assignors to Kerr-McGee Oil Industries, Inc., a corporation of Delaware
No Drawing. Filed Aug. 21, 1964, Ser. No. 391,298
14 Claims. (Cl. 195—28)

This invention relates to a novel microbial process for preparing and recovering elemental hydrogen. More particularly, the present invention relates to a process for preparing elemental hydrogen from normally gaseous hydrocarbons by the action of enzymes found in certain microorganisms.

It has been known heretofore that certain microbes are capable of oxidizing hydrocarbons and thereby utilize them for growth. In recent years the microbial oxidation of a variety of gaseous hydrocarbons has been studied, and the group of microorganisms having this biosynthetic capacity has been reclassified as *Pseudomonas methanica*.

The ability of *Pseudomonas methanica* to oxidize normally gaseous hydrocarbons has not been used extensively for industrial purposes. However, the ability of these microbes to grow upon gaseous hydrocarbons has been used in developing methods for microbiological prospecting for subterranean oil and gas deposits. Also, microbial oxidations utilizing *Pseudomonas methanica* are known in which the normally gaseous hydrocarbon may be converted to the corresponding alcohol or organic acid. For example, methane has been converted to methanol, ethane to ethanol and acetic acid, and propane to propanol and propionic acid.

The varieties of *Pseudomonas methanica* available heretofore for use in the prior art oxidation processes were not capable of preparing elemental hydrogen from gaseous hydrocarbons. The abundance of normally gaseous hydrocarbons and their low cost and the comparatively higher value of elemental hydrogen would render a fermentation process for producing elemental hydrogen very attractive from the economic standpoint. However, such a process was not available prior to the present invention.

It is an object of the present invention to provide a novel process for preparing elemental hydrogen from normally gaseous hydrocarbons by the action of enzymes found in certain microorganisms, and to recover the elemental hydrogen.

It is a further object to prepare elemental hydrogen by a fermentation process in which a specific variety of the microorganism *Pseudomonas methanica* is cultivated in an aqueous nutrient medium in the presence of a normally gaseous hydrocarbon and elemental oxygen, and to recover the elemental hydrogen thus prepared.

Still other objects and advantages of the invention will be apparent to those skilled in the art upon reference to the following detailed description and the examples.

It has been discovered that a selected natural variant of the species *Pseudomonas methanica* has the ability to synthesize elemental hydrogen when grown under certain nutritive conditions in the presence of a normally gaseous hydrocarbon and elemental oxygen. This specific microorganism is referred to in the specification and claims as *Pseudomonas methanica* variety hydrogenosis. A culture has been deposited with the Northern Regional Research Laboratory, Peoria, Ill.; and given Culture No. NRRL–B 3123. In accordance with still another important variant of the invention, it has been further discovered that normally gaseous hydrocarbons may be converted to elemental hydrogen in the presence of elemental oxygen by the action of enzymes of the type found in the microorganism *Pseudomonas methanica* variety hydrogenosis. Other than in its ability to produce hydrogen from methane, *Pseudomonas methanica* variety hydrogenosis, Culture No. NRRL–B 3123, appears to have the same morphological and cultural characteristics as known strains of *Pseudomonas methanica*.

The general fermentation conditions for obtaining good yields of elemental hydrogen from gaseous hydrocarbons may be similar to those used in other fermentation processes employing *Pseudomonas methanica*. A number of suitable nutrient media in which the microorganism *Pseudomonas methanica* will grow readily are known. One presently preferred nutrient medium contains 100 milliliters of water, 0.02 gram of sodium or potassium nitrate, 0.02 gram of magnesium sulfate, 0.01 gram of ferrous sulfate, 0.21 gram of dibasic potassium phosphate, 0.009 gram of monobasic potassium phosphate, 0.004 gram of sodium chloride, 0.0015 gram of calcium chloride, 1.0 microgram of manganous sulfate, 7.0 micrograms of zinc sulfate, 1.0 microgram of molybdic acid, 5.0 micrograms of copper sulfate, and 1.0 microgram of boric acid. It may be desirable to also add small quantities of agar or agar extract, such as up to about 0.1 gram. In instances where it is desired to grow the microorganisms on a solid medium, larger amounts of agar such as 2.0% may be added.

The nutrient medium may be adjusted in pH to any value suitable for the growth of *Pseudomonas methanica*. Preferably, the pH value is adjusted to about 6.5–8.5, and for best results to about 7.5, as *Pseudomonas methanica* variety hydrogenosis has been found to have excellent metabolic activity at these pH values. The above are initial pH values and it is understood that the pH value of the aqueous nutrient medium may change as the fermentation proceeds.

Laboratory scale fermentations may be conveniently conducted in 500 milliliter filter flasks and larger scale fermentations in any suitable type or size of fermentation vessel which is closed to the outside atmosphere. The fermentations are preferably carried out at a temperature within the range of about 15–40° C., and for better results at a temperature of about 23 to 33° C. The optimum fermentation temperature is usually about 30° C.

The fermentation vessel may have conduit means for supplying a desired gaseous atmosphere such as a mixture of one or more normally gaseous hydrocarbons and elemental oxygen, and conduit means for withdrawing hydrogen-containing gas from the vessel. The vessel may be partially filled with nutrient medium and sterilized in accordance with the prior art such as by heating at 121° C. for 30 minutes. After cooling, the vessel may be inoculated with about 0.2–20% by volume of a suspension of a 2–10 day culture of *Pseudomonas methanica* variety hydrogenosis. A mixture of oxygen and one or more normally gaseous hydrocarbons such as methane, ethane, or natural gas may be passed into the vessel and the fermentation allowed to proceed. The vessel should be closed off to the outside atmosphere while conducting the fermentation to give an isolated ecological system.

The production of elemental hydrogen by the microorganisms may be followed using standard gas chromatographic techniques. For example, a gas sample may be removed from the vessel and analyzed by conventional gas chromatographs which may be conveniently connected to a recording mechanism. Usually, it is possible to detect elemental hydrogen in the gaseous atmosphere as a fermentation product no later than the second day of the fermentation.

The fermentation may be allowed to proceed for any suitable period of time such as from one to fourteen days. Preferred results are usually obtained over a fermentation period of about 3 to 10 days and optimum yields at about the seventh day. However, it is understood that the fermentation time will depend somewhat upon the nutrient medium, the amount of inoculum employed, the fermentation temperature, and other variables. It is only necessary that the fermentation be allowed to proceed for a sufficient period of time to produce a satisfactory yield of elemental hydrogen.

Elemental hydrogen also may be produced by intimately contacting an aqueous medium containing the enzymes found in the microorganism Pseudomonas methanica variety hydrogenosis with a gaseous mixture containing elemental oxygen and one or more normally gaseous hydrocarbons. The gaseous hydrocarbon is subjected to the action of the aqueous enzymes until elemental hydrogen is produced and released into the gaseous phase, and thereafter the elemental hydrogen is recovered. The vessel for the enzymatic reaction and the reaction conditions such as time, temperature and pressure may be the same as described for the fermentation process.

The enzyme may be prepared following prior art procedures. One suitable process includes carrying out a fermentation with Pseudomonas methanica variety hydrogenosis to obtain an aqueous suspension of cells which is then concentrated by centrifuging the fermentation broth. The concentrated cells may be treated by physical methods such as sonic oscillation or trituration with powdered alumina to break the cell walls and release the enzymes into the aqueous medium. The cell debris may be removed by centrifuging to produce a crude solution which may be further purified or concentrated in the desired enzymes by known methods. A purification or concentration step is not necessary as the crude solution of enzymes may be used.

The fermentation or enzymatic reaction must be conducted in the presence of one or more normally gaseous hydrocarbons and elemental oxygen; however, the ratio of these substances may vary widely and also inert gases may be present. For example, the gaseous mixture may contain 20–90 parts by volume of the normally gaseous hydrocarbon for each 80–10 parts by volume of elemental oxygen. Inert gases such as nitrogen, helium, argon, and the like may be present if desired but they serve as diluents and normally are not necessary nor advantageous. The source of the elemental oxygen may be substantially pure oxygen, or it may contain impurities which do not have an adverse effect on the fermentation. Air may be used where the relatively small oxygen content and high nitrogen content are not detrimental. Preferred results are usually obtained when the gaseous mixture consists of 40–70 parts by volume of methane for each 60–30 parts by volume of elemental oxygen, and best results are obtained when the mixture contains about 60% by volume of methane and about 40% by volume of elemental oxygen.

It is possible to carry out the fermentation or enzymatic reaction under super-atmospheric pressure to thereby assure higher concentrations of dissolved gases in the aqueous media. The gaseous atmosphere may be bubbled through the aqueous fermentation medium or enzyme solution or agitation used to assure better contact.

The fermentation or enzymatic reaction may be conducted by a batch or continuous process. The invention lends itself especially well to large scale continuous processes in which elemental hydrogen may be produced on a commercial scale. The gaseous mixture in contact with the fermentation medium or enzyme solution may be withdrawn on a batch or continuous basis and the elemental hydrogen product recovered therefrom.

Any suitable prior art process may be used for recovering elemental hydrogen from the crude gaseous product. For example, the gaseous mixture may be enriched in elemental hydrogen content by diffusion through selective semi-permeable membranes, or by a low temperature liquefaction and fractionation process. The gaseous mixture also may be cooled to a temperature sufficiently low to liquefy and condense out gases having boiling points above hydrogen which remains in the gaseous state and may be recovered as a purified product. If desired, a combination of enrichment by diffusion, low temperature liquefaction and fractionation may be employed to thereby provide a highly selective and efficient process.

The process illustrated and described in copending application Serial No. 236,050, filed by Leo Garwin on November 7, 1962 for "Method and Apparatus for Fractionating Gaseous Mixtures by Diffusion" may be used to enrich the gaseous mixture in hydrogen content. The teachings of application Serial No. 236,050, now United States Patent No. 3,250,080, are incorporated herein by reference.

One of the by-products of the process of the invention is carbon dioxide and it accumulates in the gaseous mixture. The carbon dioxide acts as a diluent and it may be removed by absorption with an alkali hydroxide, by freezing out in a low temperature operation, or by other prior art processes. The carbon dioxide thus removed may be replaced with elemental oxygen and normally gaseous hydrocarbon and the mixture recycled in the process to thereby achieve a maximum concentration of elemental hydrogen in the final gaseous product. It is also possible to produce a final gaseous product having a much higher concentration of elemental hydrogen by first producing a gaseous mixture enriched in hydrogen by diffusion and/or low temperature liquefaction and fractionation, and then feed this mixture to a fermentation process or enzymatic reaction as the gaseous atmosphere. The final gaseous product having a much higher concentration of hydrogen may be subjected to a final purification step or steps to produce substantially pure elemental hydrogen.

The foregoing detailed description and the following specific examples are for purposes of illustration only, and are not intended as being limiting to the spirit or scope of the appended claims.

*Example I*

This example illustrates the result of varying the composition of the gaseous phase in contact with the fermentation medium.

The aqueous fermentation medium employed in this example contained 100 milliliters of water, 0.02 gram of sodium nitrate, 0.02 gram of magnesium sulfate, 0.01 gram of ferrous sulfate, 0.21 gram of dibasic potassium phosphate, 0.009 gram of monobasic potassium phosphate, 0.004 gram of sodium chloride, 0.0015 gram of calcium chloride, 1.0 microgram of manganous sulfate, 7.0 micrograms of zinc sulfate, 1.0 microgram of molybdic acid, 5.0 micrograms of copper sulfate and 1.0 microgram of boric acid. The pH value of the fermentation medium was adjusted to 7.5.

100 milliliter portions of fermentation medium containing the above ingredients was added to a series of 500 milliliter filter flasks. The flasks were then adapted for addition of a gaseous mixture, and for removal of gas samples for analysis by means of a syringe and needle inserted through a rubber septum under aseptic conditions into the gaseous phase.

After being adapted as described above, the flasks and the aqueous fermentation medium contained therein were sterilized by heating in an autoclave at 121° C. for 30 minutes. Following cooling, each filter flask was inoculated with about 1 milliliter of a suspension of a three day culture of Pseudomonas methanica variety hydrogenosis. Then, the atmosphere in the flasks above the fermentation medium was replaced with a gaseous mixture of high purity methane and elemental oxygen.

The elemental oxygen used in preparing the gaseous mixture was substantially pure. The high purity methane employed in the gaseous mixture contained 99.2 mol percent of methane, 0.32 mol percent of ethane and the remainder elemental oxygen and nitrogen. The percent hydrocarbon by volume of the gaseous mixture was varied between 0 and 100%, and the percent by volume oxygen was varied between 100% and 0%.

The filter flasks containing 100 milliliters of fermentation medium, about one milliliter of the culture of *Pseudomonas methanica* variety hydrogenosis, and an atmosphere above the fermentation medium containing the gaseous mixture of methane and elemental oxygen were closed off to give isolated ecological systems. The flasks were incubated over a fermentation time of about two days at a temperature of about 30° C. while being agitated by rotation at 200 revolutions per minute on a conventional shaker mechanism.

At the end of the fermentation period, samples of the gaseous mixtures above the fermentation media were obtained by inserting the needle of a syringe through the rubber septums of the filter flasks. The gas samples were analyzed for elemental hydrogen using standard chromatographic techniques. The data thus obtained are recorded below in Table I.

TABLE I

| Percent methane by volume | Percent elemental oxygen by volume | Elemental hydrogen (cc. per cc. of gas sample) |
|---|---|---|
| 100 | 0 | 0.00000 |
| 70 | 30 | 0.00333 |
| 60 | 40 | 0.00379 |
| 50 | 50 | 0.00333 |
| 40 | 60 | 0.00314 |
| 0 | 100 | 0.00000 |

In instances where the gaseous mixture added to a filter flask contained 100% methane or 100% oxygen by volume, no hydrogen was detected in the gas sample. However, in all instances where a mixture of methane and elemental oxygen was added to the filter flasks, elemental hydrogen was produced as a fermentation product and was present in the sample of gaseous mixture. The yield of elemental hydrogen increased with increasing methane contents in the gaseous mixture up to 60% by volume of methane and 40% by volume of elemental oxygen.

Substitution of high purity methane which contained no ethane (99.5% by volume of methane) for the methane used in obtaining data for Table I gave similar results.

*Example II*

This example illustrates the result of varying the fermentation time on yield of elemental hydrogen. The general procedure and apparatus of Example I were used except when noted to the contrary hereinafter.

In this example, a mixture of 50% methane and 50% elemental oxygen (by volume) was metered into a 500 milliliter filter flask containing 100 milliliters of a well populated and enzymatically active broth of *Pseudomonas methanica* variety hydrogenosis. Otherwise, the fermentation medium and techniques were the same as used in Example I. A 0.30 cc. sample of the gaseous phase in the 500 milliliter filter flask was removed daily by syringe and analyzed by gas chromatographic techniques for elemental hydrogen.

Elemental hydrogen was observed in the gas sample withdrawn at the end of the first day of the fermentation period, and the amount increased to a maximum of 0.00736 cc. per cc. of gas sample on the seventh day of the fermentation period. The elemental hydrogen concentration decreased after the seventh day.

The concentrations of elemental hydrogen observed in the gas samples withdrawn at various fermentation times are given below in Table II.

TABLE II

| Fermentation time in days: | Elemental hydrogen (cc. per cc. of gas sample) |
|---|---|
| 0 | 0.00000 |
| 1 | 0.00165 |
| 2 | 0.00379 |
| 3 | 0.00531 |
| 4 | 0.00595 |
| 5 | 0.00545 |
| 6 | 0.00610 |
| 7 | 0.00736 |
| 8 | 0.00545 |
| 9 | 0.00520 |
| 10 | 0.00530 |

*Example III*

This example illustrates the result of varying the hydrocarbon substrate on the yield of elemental hydrogen. The general procedure and the apparatus employed in this example were the same as those of Example I unless indicated to the contrary hereinafter.

The methane employed in this example was the same as that of Example I. The high purity ethane contained 99.3 mol percent of ethane, 0.4 mol percent of ethylene, 0.2 mol percent of propylene and 0.1 mol percent of propane. The natural gas contained 99.4 mol percent of methane, 4.2 mol percent of ethane and smaller quantities of heavier hydrocarbons and traces of carbon dioxide.

The fermentations were conducted as in Example I and samples of the gaseous mixtures at the end of the fermentation period were analyzed for elemental hydrogen by gas chromatographic techniques. The results thus obtained are tabulated below in Table III.

TABLE III

| Percent hydrocarbon by volume | Percent elemental oxygen by volume | Percent elemental nitrogen by volume | Elemental hydrogen (cc. per cc. of gas sample) |
|---|---|---|---|
| 100 methane | 0 | 0 | 0.00000 |
| 0 methane | 100 | 0 | 0.00000 |
| 50 methane | 50 | 0 | 0.00333 |
| 40 ethane | 40 | 20 | 0.00333 |
| 65 natural gas | 35 | 0 | 0.00474 |
| 55 natural gas | 45 | 0 | 0.00483 |

It may be seen from the above data that enzymes of the type found in *Pseudomonas methanica* variety hydrogenosis are capable of converting a variety of gaseous hydrocarbons into elemental hydrogen. Also, the presence of an inert gas such as elemental nitrogen is not detrimental other than in diluting the hydrocarbon-elemental oxygen mixture.

*Example IV*

The general procedure and apparatus of this example was the same as that employed in Example I except as indicated to the contrary hereinafter. In this example, a highly purified deuterated methane ($CD_4$) was substituted for the methane ($CH_4$) of Example I in an effort to determine if methane is converted directly into carbon dioxide and elemental hydrogen, or if certain biochemical intermediates are formed in the aqueous nutrient medium prior to the evolution of elemental hydrogen.

The concentration of elemental deuterium in the gaseous mixture was determined with a gas chromatograph using elemental nitrogen as a carrier gas. The apparatus was arranged in such a way that any $D_2$ produced would appear along with elemental hydrogen or HD. A second gas chromatograph was employed with elemental hydrogen as the carrier gas. With this system, the instrument does not respond to hydrogen but it does respond to any deuterium that is produced. Pure $H_2$ and $D_2$ were used to standardize both instruments. In this experiment, if $D_2$ were synthesized by the microorganisms directly from $CD_4$ and no oxidative intermediates were formed in the aqueous fermentation medium, there would be no dilution of $D_2$ with $H_2$ and only $D_2$ would be produced.

The fermentation was conducted as described in Example I except for substituting $CD_4$ for methane. At the end of the fermentation period, a sample of the gaseous fermentation product was taken and analyzed as described above to determine whether or not $D_2$ alone, $H_2$ alone, or a mixture of $D_2$ and $H_2$ was produced. The data indicated that $D_2$ constituted only about 27% of the combined quantity of $D_2$ and $H_2$ present in the gas sample. Thus, a mixture of $D_2$ and $H_2$ was produced. While the data do not necessarily exclude a direct conversion of $CD_4$ to $D_2$ as one mechanism of the hydrogen synthesis, it is indicative that hydrogen is also derived from oxidative intermediates formed in the presence of the aqueous medium during the enzymatic oxidation of the methane.

*Example V*

This example illustrates the recovery of elemental hydrogen from the gaseous fermentation product of the invention.

A commercial scale fermentation vessel adapted to be closed off from the atmosphere is partially filled to approximately one-fifth of its volume with a nutrient medium such as described in Example I, the system sterilized, and then inoculated with *Pseudomonas methanica* variety hydrogenosis. The system is closed off to the atmosphere and the fermentation allowed to proceed after addition of a gaseous mixture containing 60% by volume methane and 40% by volume oxygen. The contents of the fermentation vessel are agitated to assure intimate contact between the gaseous atmosphere and the nutrient medium.

The fermentation is allowed to continue until an equilibrium concentration of hydrogen is present in the gaseous mixture. Then, a stream of the gaseous mixture is withdrawn continuously and passed to a prior art low temperature liquefaction and fractionation apparatus for the purpose of recovering an elemental hydrogen product. The prior art liquefaction and fractionation apparatus includes prior art means for removing water vapor and carbon dioxide, and liquefying the methane to produce a partially purified gaseous mixture containing elemental oxygen and hydrogen. The elemental oxygen content of the resulting gaseous mixture is liquefied to leave behind a gaseous product of elemental hydrogen.

The water removed from the withdrawn stream of gaseous mixture is discarded, and the carbon dioxide is recovered as a substantially pure carbon dioxide product for sale. The elemental oxygen and methane are recycled to the fermentation vessel and make up feeds also are added to replace the atmosphere of methane and elemental oxygen in the fermentation vessel.

It is possible to produce elemental hydrogen and carbon dioxide as commercial products on a continuous basis when following the procedure of this example. The only raw materials which are necessary are the methane and elemental oxygen, and the nutrients for the microorganisms.

*Example VI*

This example illustrates the preparation of the enzyme found in the microorganism *Pseudonas methanica* variety hydrogenosis and its use in the preparation of elemental hydrogen.

A fermentation is carried out following the procedure of Example I to produce a fermentation broth having a high cell count. The broth is centrifuged to further concentrate the cells and the concentrate is subjected to sonic oscillation with a 12 kilocycle unit to break down the intact cell walls and release the contained enzymes. The resulting mixture is centrifuged to remove the cell debris and produce a crude solution containing active enzymes of *Pseudomonas methanica* variety hydrogenosis.

The crude solution of enzymes is intimately contacted in a closed vessel with a gaseous mixture containing 60% by volume of methane and 40% by volume of elemental oxygen at a temperature of about 30° C. Analysis of the gaseous phase above the enzyme solution showed a steadily increasing concentration of elemental hydrogen, thereby indicating the production of elemental hydrogen at an effective rate. The contacting of the enzyme solution with the methane-elemental oxygen mixture is terminated when a maximum concentration of elemental hydrogen is produced as indicated by analysis of a series of samples. Thereafter, the elemental hydrogen is recovered from the gaseous phase following the procedure illustrated in Example V.

Other methods of breaking down the cell walls such as by trituration with powdered alumina may be used. It is also possible to concentrate the crude enzyme solution following prior art procedures and/or purify it by known methods. More concentrated solutions of enzymes are usually more effective in producing hydrogen at a faster rate.

It is not necessary to separate the cell debris from the solution of enzyme. If desired an enzyme solution containing the suspension of cell debris may be contacted with the methane and elemental oxygen and acceptable yields of hydrogen obtained.

What is claimed is:

1. A process for preparing elemental hydrogen comprising intimately contacting a gaseous mixture including a normally gaseous hydrocarbon and elemental oxygen with an aqueous medium, the aqueous medium being within a system closed to the outside atmosphere, the aqueous medium containing an enzyme found in the microorganism *Pseudomonas methanica* variety hydrogenosis capable of oxidizing the gaseous hydrocarbon in the presence of the elemental oxygen and producing elemental hydrogen therefrom, the gaseous hydrocarbon being subjected to the action of the enzyme in the aqueous medium until elemental hydrogen is produced and released into the gaseous mixture, and recovering elemental hydrogen thus produced from the gaseous mixture.

2. The process of claim 1 wherein the normally gaseous hydrocarbon contains less than three carbon atoms.

3. The process of claim 1 wherein the normally gaseous hydrocarbon comprises methane.

4. The process of claim 1 wherein the normally gaseous hydrocarbon comprises natural gas.

5. A process for preparing elemental hydrogen comprising cultivating the microorganism *Pseudomonas methanica* variety hydrogenosis in an aqueous nutrient medium therefor, the nutrient medium being within a system closed to the outside atmosphere and in contact with a gaseous mixture comprising a normally gaseous hydrocarbon and elemental oxygen, the said *Pseudomonas methanica* being cultivated in the nutrient medium until elemental hydrogen is produced and released into the gaseous mixture, and recovering elemental hydrogen thus produced from the gaseous mixture.

6. The process of claim 5 wherein the gaseous mixture contains about 20–90 parts by volume of the normally gaseous hydrocarbon for each 80–10 parts by volume of elemental oxygen.

7. The process of claim 5 wherein the normally gaseous hydrocarbon contains less than three carbon atoms.

8. The process of claim 5 wherein the initial pH value of the aqueous nutrient medium is about 6.5–8.5.

9. The process of claim 5 wherein the temperature of the aqueous nutrient medium is about 15–40° C.

10. A process for preparing elemental hydrogen comprising cultivating the microorganism *Pseudomonas methanica* variety hydrogenosis in an aqueous nutrient medium therefor, the nutrient medium having a temperature of about 15–40° C. and an initial pH value of about 6.5–8.5, the nutrient medium being within a vessel closed to the outside atmosphere and in contact with a gaseous mixture comprising a normally gaseous hydrocarbon containing less than three carbon atoms and elemental oxygen, the gaseous mixture containing about 20–90 parts by volume of the normally gaseous hydrocarbon for each 80–10 parts by volume of elemental oxygen, the said *Pseudomonas methanica* being cultivated in the nutrient medium until elemental hydrogen is produced and released into the gaseous mixture, and recovering elemental hydrogen thus produced from the gaseous mixture.

11. The process of claim 10 wherein the gaseous mixture consists essentially of about 40–70 parts by volume of methane for each 60–30 parts by volume of elemental oxygen, and the temperature of the aqueous nutrient medium is about 23–33° C.

12. The process of claim 10 wherein the gaseous mixture consists essentially of about 60 parts by volume of methane and about 40 parts by volume of oxygen, and the aqueous nutrient medium has a temperature of about 30° C. and a pH value of about 7.5.

13. The process of claim 10 wherein the gaseous mixture consists essentially of about 40–70 parts by volume of natural gas for each 60–30 parts by volume of elemental oxygen, and the temperature of the aqueous nutrient medium is about 23–33° C.

14. The process of claim 10 wherein the gaseous mixture consists essentially of about 60 parts by volume of natural gas and about 40 parts by volume of oxygen, and the aqueous nutrient medium has a temperature of about 30° C. and a pH value of about 7.5.

References Cited by the Examiner

Leadbetter and Foster, Archiv fur Mikrobiologie 30, 91–118 (1958).

A. LOUIS MONACELL, *Primary Examiner.*

L. M. SHAPIRO, *Assistant Examiner.*